United States Patent [19]
Harding et al.

[11] Patent Number: 6,165,531
[45] Date of Patent: Dec. 26, 2000

[54] MOLDING PROCESS

[75] Inventors: William Harding, Condicote Cheltenham, United Kingdom; Neil A. Willcocks, Columbia, N.J.; Christopher Abbott, London, United Kingdom; Thomas M. Collins, Nazareth, Pa.; Tracey D. B. Ziener, Bracknell, United Kingdom

[73] Assignee: Mars, Incorporated, McLean, Va.

[21] Appl. No.: 09/227,926

[22] Filed: Jan. 8, 1999

Related U.S. Application Data

[60] Provisional application No. 60/070,874, Jan. 9, 1998.

[51] Int. Cl.[7] ................................................. A23G 1/00
[52] U.S. Cl. ........................... 426/512; 426/515; 426/660
[58] Field of Search .................................... 426/512, 515, 426/660; 425/362

[56] References Cited

U.S. PATENT DOCUMENTS

| | | | |
|---|---|---|---|
| 356,450 | 1/1887 | Coleman | 426/515 |
| 371,176 | 10/1887 | Coleman | 426/515 |
| 534,632 | 2/1895 | Coleman | 426/515 |
| 3,662,693 | 5/1972 | Dana | 264/299 |
| 4,059,378 | 11/1977 | Sollich | 425/362 |
| 4,200,658 | 4/1980 | Katzman et al. | 426/512 |
| 4,946,696 | 8/1990 | Nendl et al. | 426/383 |
| 5,635,230 | 6/1997 | Aasted | 426/512 |

FOREIGN PATENT DOCUMENTS

| | | |
|---|---|---|
| 0 422 883 A1 | 4/1991 | European Pat. Off. . |
| 0 630 574 A1 | 12/1994 | European Pat. Off. . |
| 1590193 | 5/1970 | France . |
| 2747886 | 10/1997 | France . |
| 38-12718 | 7/1963 | Japan . |
| WO 89/05095 | 6/1989 | WIPO . |
| WO 94/07375 | 4/1994 | WIPO . |
| WO 95/32633 | 12/1995 | WIPO . |

OTHER PUBLICATIONS

R. Good et al., "The Modern Theory of Contact Angles and Hydrogen bond Components of Surface Energies", *Modern Approaches to Wettability–Theory and Applications*, Ch.1, pp. 1–27 (Plenum, New York, 1992).

B. Minifie, (*Chocolate, Cocoa and Confectionery: Science and Technology*, 3rd Ed., pp. 183, 198–207, 533–537 (1989).

R. Wille et al., "Polymorphism of Cocoa Butter", *J. Am. Oil Chem. Soc.*, vol. 43 pp. 491–496 (1966).

*Primary Examiner*—George C. Yeung
*Attorney, Agent, or Firm*—Fitzpatrick, Cella, Harper & Scinto

[57] ABSTRACT

This invention provides improved methods for producing molded chocolate products, fat-based confection products, particularly using substrates such as molds which have a low surface energy contacting surface.

22 Claims, No Drawings

MOLDING PROCESS

This application claims the benefit of U.S. Provisional Patent Application No. 60/070,874 filed Jan. 9, 1998.

BACKGROUND OF THE INVENTION

1. Field of the Invention

The invention relates to a method for producing fat based confection compositions, e.g., chocolates, by contacting a surface comprising a low surface-energy material.

2. Related Background Art

A wide variety of materials have been used to mold confections. The confection industry generally used metals, polycarbonates and silicone rubber. Chocolate manufactures, however, have generally employed metal, and more recently polycarbonate molds.

Chocolates and chocolate-like compositions having a desired three-dimensional shape or having an image or design imprinted on a surface (herein referred to as "molded chocolates") are conventionally produced by molding. Molding is the casting of liquid chocolate into molds (plastic or metal) followed by cooling and demolding. The finished chocolate may be a solid block, a hollow shell, or a shell filled with a confectionery material such as fondant, fudge or soft caramel (*Chocolate, Cocoa and Confectionery: Science and Technology* by Bernard W. Minifie, Third Edition, page 183), the disclosure of which is incorporated by reference herein in its entirety.

Molded chocolate products are conventionally produced by depositing tempered chocolate having a liquid fat phase into molds, allowing the chocolate to cool and harden into solid pieces before demolding the chocolate (*Chocolate, Cocoa and Confectionery: Science and Technology* by Bernard W. Minifie, Third Edition, pages 198–206). The most commonly used method of producing a shaped chocolate involves the following sequential steps:

A. heating the chocolate to soften, i.e., melting of the fat phase;

B. tempering the chocolate;

C. depositing the tempered chocolate into a mold;

D. shaking the mold to remove air bubbles and fully distribute the chocolate in the mold cavity;

E. cooling to harden the chocolate; and

F. removing said set shaped chocolate from said mold ("de-molding").

One disadvantage of the conventional molding process is the excessive time required to fill the mold, shake the mold to remove air pockets and solidify the chocolate to form a shaped piece. In particular, the cooling time required for molding chocolate products often exceeds 20 minutes for a small (about 1 g) piece, and 40 minutes for a large (about 100 g) piece. For complex shell molded products, which require numerous production steps, the total production time can be on the order of 1–2 hours. Demolding of molded chocolate products is typically accomplished by using a combination of flexing the molds and/or a strong impact force to free the products from the molds. The length of the molding cycle greatly reduces the efficiencies of such commercial production lines and requires the use of a large number of molds.

Another disadvantage of conventional molding processes is that they rely on the contraction of chocolate products away from the mold during solidification of the chocolate to effect release from the mold cavity. *Chocolate, Cocoa and Confectionery: Science and Technology* by Bernard W. Minifie, Third Edition, page 207. Problems are frequently encountered in molding chocolate products which do not contract greatly upon solidification, e.g., aerated chocolates, twin shells and lowfat chocolates. Shell molded chocolates are also typically more fragile than other chocolate products, and thus are prone to cracking upon attempts forcibly demold them using a very strong impact. For this reason, shell products are often molded at greater than the desired thickness to minimize damage. This limits flexibility in product design, e.g., may increase the cost of the product needlessly, or result in a higher caloric product than desired. Flexible molds have been used in the art of making hand candies. U.S. Ser. No. 356,450 discloses a process comprising casting a fluid from a hopper into mold cavities in the surface of a continuous flexible belt which surrounds, and is propelled by rollers. The fluid is allowed to solidify as the belt travels beyond the hopper until the belt passes over a roller, flexing the belt and thereby demolding the casting. U.S. Ser. No. 371,176 discloses a flexible mold for candy manufacture. The side walls of the mold are cut or split in order to facilitate flexing of the mold and removal of the castings. U.S. Ser. No. 534,632 discloses an improvement to the flexible candy mold of U.S. Ser. No. 371,176 in which there are air spaces between the mold cavities to facilitate cooling. No suggestion is made that these processes are suitable for producing molded chocolates or that contacting surfaces of low surface energy would be advantageous.

U.S. Pat. No. 4,946,696 discloses a process for patterning a layer of colored cocoa butter on the surface of a molded chocolate. The cocoa butter is cast into shallow indentations in a base sheet which is preferably flexible, then a chocolate composition is cast into mold matrices which are aligned with the indentations in the base sheet. No suggestion is made that production of a molded chocolate using a mold with a contacting surface having a low surface energy would be advantageous.

U.S. Pat. No. 4,200,658 discloses a flexible silicone rubber mold which is flexed to allow removal of molded chocolate products. French Patent No. 1,590,193 and Japanese Laid-Open Application No. 38-12718 each disclose a flexible mold, which may be made of a silicone, and which may be used for molding of chocolate products. No suggestion is made in any of these references that the surface energy of the mold contacting surface is an important parameter related to easy demolding of molded chocolate products.

PCT Patent Publication WO 94/07375 to Cebula et al. relates to forming fat-containing products such as chocolate in molds at temperatures at or below 0° C. to provide unforced demolding.

The above-identified methods of producing molded chocolate products using conventional molds and conventional molding methods are characterized by long cycle times, which decrease efficiency by requiring use of large numbers of molds and long cooling tunnels. It would therefore be highly desirable to provide a method of making molded products in a more efficient manner.

A method for molding chocolate that facilitates demolding of the molded chocolate product would be highly desirable.

SUMMARY OF THE INVENTION

This invention is directed to a method for producing fat-based confection compositions by the steps of: (a) contacting a fat-based confection composition containing a liquid fat phase with a surface of a substrate, said substrate surface having a surface energy less than about 30 mJ/m² as measured at about 23° C. using the art recognized three-liquid contact angle procedure; and (b) releasing said fat-based confection composition from the substrate surface to form said fat-based confection composition.

The method of this invention advantageously provides a means for improving production of fat-based confection products, and particularly molded fat-based confection products, by reducing production time and physical plant size. Therefore, cost advantages can be achieved compared to the fat-based confection molding methods of the prior art.

DETAILED DESCRIPTION OF THE INVENTION

Definitions

1. Fat-Based Confection

The term "fat-based confection" refers to a product comprising edible food solids or syrups dispersed in a continuous fat phase or fat-like phase. Typically, the fat phase or fat-like phase is temperable, contracting, or temperable and contracting. However, the fat phase or fat-like phase may also include fat systems which are non-temperable or non-contracting, or both. Edible food solids include, for example, nutritive sweeteners, milk solids and sugar substitutes. The fat-based confection may also contain emulsifiers.

The term "sugar substitute" includes bulking agents, sugar alcohols (polyols), or high potency sweeteners or combinations thereof. In an alternative embodiment of the present invention, a sugar substitute may partially replace the nutritive carbohydrate sweetener. The high potency sweeteners include aspartame, cyclamates, saccharin, acesulfame, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K. Examples of sugar alcohols may be any of those typically used in the art and include sorbitol, mannitol, xylitol, maltitol, isomalt, lacitol and the like.

The term "bulking agents" as defined herein may be any of those typically used in the art and include polydextrose, cellulose and its derivatives, maltodextrin, gum arabic, and the like.

Examples of safe and suitable emulsifiers may be any of those typically used in the art and include lecithin derived from vegetable sources such as soybean, safflower, corn, etc., fractionated lecithins enriched in either phosphatidyl choline or phosphatidyl ethanolamine or both, mono- and diglycerides, diacetyl tartaric acid esters of mono- and diglycerides (also referred to as DATEM), PGPR, monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and diester of fats and fatty acids, or emulsifier that may become approved for the USFDA-defined soft candy category. In addition, other emulsifiers that can be used in the present invention, include polyglycerol polyricinoleate, ammonium salts of phosphatidic acid, sucrose esters, oat extract, etc., any emulsifier found to be suitable in chocolate or similar fat/solid system or any blend provided the total amount of emulsifier does not exceed 1% by weight. Emulsifiers preferred for use in the present invention are lecithin, fractionated lecithin, diacetyl tartaric acid esters of mono- and diglycerides (DATEM) or mixtures of these emulsifiers at a maximum level of 1% of any one emulsifier or any mixture of emulsifiers.

Nutritive carbohydrate sweeteners with varying degrees of sweetness intensity useful in the present invention may be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the as crystals or particles.

The term "fat-based confection" is not intended to include frozen confections, e.g., ice cream, but includes both chocolate confections and non-chocolate confections. Examples of non-chocolate confection are Caramac®, a product of Nestle, Inc., and white chocolate. Other examples of fat-based confections include, without limitations, chocolates (SOI and non-SOI), truffles, pralines and the like.

2. Chocolate

The term "chocolate" is intended to refer to all chocolate or chocolate-like compositions with a fat or fat-like phase. As the invention is directed to the control of the characteristics of the fat or fat-like phase of the chocolate, rather than the non-fat materials within the chocolate, the term is intended to include all chocolate and chocolate-like compositions that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the SOI, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates, compound coatings and chocolate-like compositions, unless specifically identified otherwise.

The fat phase of the chocolate of the present invention can include cocoa butter, milk fat, hydrogenated or partially hydrogenated vegetable oils or fats (fractionated or unfractionated) anhydrous milk fat, butter oil, and other fats or mixtures of cocoa butter with these other fat-like compositions. See Minifie, *Chocolate, Cocoa and Confectionery Science and Technology* 3rd Ed. The fat phase may include fat systems which are non-tempering or non-contracting, or both.

Chocolates also includes those containing crumb solids or solids fully or partially made by a crumb process.

Nonstandardized chocolates result when the nutritive carbohydrate sweetener is replaced partially or completely; or when the cocoa butter or milkfat are replaced partially or completely; or when components that have flavors that imitate milk, butter or chocolate are added or other additions or deletions in formula are made outside the USFDA standards of identify of chocolate or combinations thereof.

The chocolate may also contain other ingredients, for example, sugar substitutes, bulking agents, and emulsifiers.

3. The term "chocolate confection" refers to chocolate products that are stable at ambient temperatures for extended periods of time (i.e., greater than 1 week). These products are characterized as microbiologically shelf-stable at 65° F.–85° F. under normal atmospheric conditions. The term "confection" is not intended to include ice cream products or other products that are typically stored at temperatures below 0° C. and which are designed to be consumed while in a frozen state. As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers or the like. Other complex confections result from surrounding soft inclusions such as cordial cherries or peanut butter with chocolate and other complex confections result from coating ice cream or other frozen or refrigerated desserts with chocolate. However, chocolate coatings on ice cream or other frozen products typically do not contain stable fat crystals and are not included in the present invention.

4. The term "chocolate-like compositions" refers to chocolate flavored compositions containing solid particles dispersed in a fat or fat-like phase.

5. The term "crystalline fat" refers to a liquid fat which has been cooled to allow the fat to undergo a phase transition to one or more crystalline forms or polymorphs. For example, cocoa butter may crystallize as any one of six recognized polymorphs. In the case of a non-polymorphic, i.e., non-tempering, fat there will be only one crystalline form.

6. Set chocolate product

The term "set chocolate product" refers to a product in which sufficient fat has solidified at a given temperature to provide the product with a minimum degree of physical integrity, such that its shape and appearance are maintained at the given temperature.

7. Fats

The term "fats", as used herein, refers to triglycerides, diglycerides and monoglycerides or other fat-like materials that can normally be used in fat-based confections, including chocolates and chocolate-like products. Fats include the naturally occurring fats and oils such as cocoa butter, pressed cocoa butter, expeller cocoa butter, solvent extracted cocoa butter, refined cocoa butter, milk fat, anhydrous milk fat, fractionated milk fat, milk fat replacers, butterfat, fractionated butterfat, fats (fractioned or unfractioned) vegetable fats, hydrogenated or partially hydrogenated vegetable modified vegetable fats and synthetically modified fats such as Caprenin.

8. Chocolate composition comprising a liquid fat phase

The term "chocolate composition comprising a liquid fat phase" refers to a chocolate or chocolate-like composition where the fat phase is liquid or partially liquid.

9. Continuous fat phase

The term "continuous fat phase" refers to the fat phase of a chocolate which represents the continuous phase into which are dispersed the non-fat particles and any fat seed crystals conventionally produced through tempering, where the chocolate in a fluid state is representative of a solid in liquid dispersion.

10. Stable fat crystals

The term "stable fat crystals" is used in reference to polymorphic, tempering fats and refers to those crystalline forms or polymorphs that are stable at higher temperatures, that is these polymorphs have higher melting points. For cocoa butter, six crystal polymorphs have been recognized and characterized both by thermal analysis and X-ray diffraction and these six forms are well known to those skilled in the art of chocolate manufacture (see Wille et al., "Polymorphism of Cocoa Butter", J. Am. Oil Chem. Soc., Vol. 43 (1966) pages 491–96). Referring to cocoa butter then, the term "stable fat crystals" is meant to include the form V and form VI polymorphs which melt at higher temperatures. The form IV polymorph is also relatively stable and is believed to convert fairly readily to form V, and thus is also desirable.

The term "unstable fat crystals" refers to the remaining lower melting lower polymorphs.

11. Temper

The term "temper" refers to the presence of stable fat crystals in a chocolate. The degree or level of temper in a chocolate can be measured by commercially available instruments which characterize the behavior of a chocolate sample during controlled cooling. An example of this type of instrument is the Tricor Tempermeter [Tricor Instruments, Elgin, Ill.] which in its standard embodiment, determines chocolate temper during a 5 minute controlled cooling test. The Tempermeter detects and measures an inflection point in a temperature versus time curve. The units of temper may be expressed as chocolate temper units (CTU) and/or as a slope measurement. CTU measurements can be expressed in either the Fahrenheit or Celsius temperature scale. All CTU measurements referred to herein are in the Fahrenheit scale, unless otherwise specified. Fahrenheit CTU measurements can be converted to Celsius measurements by dividing by a factor of 1.8. Higher CTU values and lower slope values correspond with higher levels of temper.

12. The term "molding" refers to methods wherein chocolate, either plain or mixed with inclusions such as nuts, raisins, crisped rice and the like is deposited in molds, allowed to cool and hardened into solid or partially solidified pieces of any shape, including hollow shells.

13. The term "bloom stable chocolate" refers to chocolate products having good shelf-life, i.e., those chocolate products capable of resisting the development of visually detectable (without magnification) fat bloom when stored at ambient temperatures over extended periods of time. Ideally, bloom stable products should also be able to withstand some degree of thermal stressing near ambient temperatures over extended periods of time without the development of visually detectable fat bloom. For example, a chocolate may be characterized as being "bloom stable" if it does not bloom after exposure to five 24 hour cycles comprised of 8 hours at 30° C. (86° F.) followed by 16 hours at 21.1° C. (70° F.).

14. The term "gloss" refers to a physical property which is characteristic of the visual appearance of a chocolate and is very important for consumer acceptance. More specifically, gloss refers to the ability of the surface of a chocolate product to reflect incident light giving a "shiny" or "glossy" appearance.

15. The term "glossy" refers to a chocolate having an acceptable gloss, i.e., not dull, substantially uniform, etc. Although a relatively subjective term, the use of the term is well known to those skilled in the art.

16. Viscosity

Chocolate displays non-Newtonian rheology and cannot be totally characterized by a single rheological measurement point. Despite this, apparent viscosity is a simple measure of viscosity useful for the evaluation of tempered and untempered chocolates and their suitability for operations such as enrobing and molding. The measurement of apparent viscosity can be accomplished by many methods. The method used herein for apparent viscosity measurements is as follows: The chocolate is maintained at the desired measurement temperature. The viscosity is measured using a Brookfield viscometer Model RV equipped with a "B" size T-spindle (approximately 36.4 mm cross-bar) and operating at 4 RPM. The spindle is immersed in the chocolate to be measured and allowed to rotate three times. The reading is taken after the third rotation and multiplied by 1000. The resultant value is the apparent viscosity in centipoise.

17. The term "shape" refers to any three-dimensional forms including cubic shapes, animal shapes, etc.

18. The term "mold" refers to a device having at least one mold cavity which defines the shape of the molded product. A fat-based confection composition is deposited into a mold cavity and may be vibrated or tamped to ensure that it completely fills the cavity. The term "mold" is intended to exclude devices which are pressed onto a chocolate composition, e.g., embossers and formers.

19. The term "tamping" refers to a process in which a cold surface, typically metal, for example, at a temperature less than about −15° C. is brought into contact with the exposed surface of a chocolate composition in a mold to ensure complete filling of the mold cavity and flatten the exposed surface.

The substrates employed in the method of this invention are not limited, but include, for example, molds, forming devices, embossers and the like. The substrate may be made of any material so long as the surface of the substrate meets the surface energy criteria described herein. The substrate material itself may meet this criterion or the surface of the substrate may be comprised of a coating, layer, insert or the like, meeting the desired surface energy criteria. The actual surface energy of the surface of the substrate may be varied as desired to affect the release properties of the fat-based confection composition so long as the required surface energy criteria is met.

Contraction of chocolate occurs as the fat phase of the chocolate crystallizes. However, this is not the only factor affecting release of the chocolate from a mold. As crystallization proceeds, the cohesive forces within the chocolate increase, thereby overcoming the adhesive forces between the mold and the chocolate. These adhesive forces are believed to be a limitation to demolding chocolate.

In the method of this invention, improved molding of molded fat-based confection products is achieved through the use of molds having contacting surfaces of low surface energy. Such molds allow easier and faster demolding of molded fat-based confection products from the mold cavities than conventional molds. The preferred molded fat-based confection product is a molded chocolate product. The molds can be shell molds, block molds, frozen cone molds such as described in PCT Application WO 95/32633, book, spin and flexible or the like.

Such materials may include, for example, polymers, polymer laminates, metal-polymer laminates and filled polymers.

Surface energy is a measure of the adhesive force between a surface and another substance. Materials of high surface energy have better wetting characteristics. The energy of a surface is measured by placing a drop of liquid on the surface to be measured. The angle between the surface and the outside surface of the drop is measured through the air, and is known as the contact angle, θ. Large contact angles are observed when a liquid wets a surface well and spreads into a thin film. Small contact angles are observed when a liquid does not wet a surface well and forms droplets on the surface. The following equation is used to determine the surface energy $\gamma_{S/A}$:

$$\gamma_{S/A} = \gamma_{S/L} + \gamma_{L/A}(\cos \theta)$$

$\gamma_{L/A}$, which represents the surface tension between the liquid and air, and $\gamma_{S/L}$, which represents the surface tension between the surface and the liquid, are known or can be determined by well known methods. Typically, the three contact angles procedure is employed to ascertain the surface energy as described in R. J. Good and C. J. von Oss, "Modern Approaches to Wettability—Theory and Applications", Plenum, New York (1992) Chapter 1, pp. 1–27, the disclosure of which is incorporated by reference herein.

Materials suitable for use in constructing the contacting surfaces of the substrates used in the method of this invention are those having a surface energy less than about 30 mJ/m$^2$, including, for example, poly[tetrafluoroethylene] and low surface energy silicone rubber, as measured by the three-liquid contact angle procedure at a temperature of about 23° C.

Preferably, the materials have a surface energy less than about 25 mJ/m$^2$, most preferably less than about 20 mJ/m$^2$ measured as described above. It is believed that surface energy must be great enough, e.g. about 5 mJ/m$^2$ at 23° C., to provide enough wetting for the chocolate based composition to reasonably reproduce the desired shape in accordance with the substrate. Preferred materials include poly[tetrafluoroethylene] and Palesit 394 (a silicone rubber available from Mason Chemical Co. Ltd., Croydon, U.K.).

In this embodiment of the invention the substrate need not be flexible, although in one embodiment it is preferred that the substrate is flexible. The low surface energy contacting surface may be an integral part of the substrate or a coating or an insert having the desired low surface energy.

Flexible molds allow mold (this term as used herein refers to products made in a mold and/or produced by a molding process) products to be demolded more readily upon distorting the mold cavities than would a conventional rigid mold. A mold cavity maybe distorted by either flexing it or by prodding the back of the mold opposite the mold cavity. Raised portions on the back of the mold opposite the mold cavities are useful in prodding the cavities when the raised portions contact raised portions on a surface contacting the mold, e.g., a conveyer belt.

Flexibility of materials may be described in terms of the elongation at break and shore hardness. Increased flexibility is correlated with large values of the elongation at break.

In a preferred embodiment of this invention molds for improved molding of chocolate products are constructed from materials which have an elongation at break of at least 200% and a shore hardness of less than 50 A. Preferably, the materials have an elongation at break of at least about 250%, and a shore hardness of less than 40 A.

Molds having contacting surfaces of low surface energy will often release the molded products upon inverting the mold, or at least with less forceful impact than conventional molds. Easier demolding reduces mechanical wear of the molds caused by forceful demolding and also decreases loss of product through sticking and breakage during demolding, especially for products which are fragile, e.g., those with intricate designs and those having regions with small cross-sectional area. Fat-based confections which do not contract or which contract relatively little, e.g., aerated chocolates and confections based on non-contracting fats, demold more readily from flexible molds having contacting surfaces of low energy. Easier demolding also allows molded chocolate products to be demolded before the full amount of contraction occurring with crystallization has been realized. Faster demolding leads to reduced cycle times for molds, thereby reducing the number of molds necessary for a given production line.

Easier demolding improves the compatibility of molding and "pick-and-place" technology for removal of molded product from the mold cavities. Pick-and-place devices are robotic systems which lift molded products by means of suction and move them to a surface, e.g., a conveyer belt, where they are deposited for further processing by terminating the suction. Molded products must demold easily and cleanly for application of this technology to be feasible. An example of a commercial device utilizing pick-and-place technology is the Aasted 275 Mini Moulding Line, manufactured by Aasted, Ltd.

A further advantage of flexible molds is the increased efficiency of tamping devices in ensuring that the chocolate composition completely fills the mold cavity. This is believed to occur because the mold cavity deforms when the tamper contacts the chocolate composition, thus facilitating flow of the chocolate into all parts of the mold. Efficient tamping is especially important for aerated chocolates because vibration of the mold to ensure complete filling of the mold cavity causes undesirable loss of aeration.

Optionally, the embodiments of this invention are practiced together with techniques for enhanced molding, as disclosed in PCT International Application No. PCT/US98/00605, entitled "ENHANCED CONFECTIONERY MOLDING" filed contemporaneously herewith, and incorporated by reference herein.

Optionally, the embodiments of this invention are practiced together with techniques for forming, as disclosed in U.S. patent application Ser. No. 08/782,901, filed Jan. 11, 1997 now abandoned, and PCT International Application No. PCT/US98/00658, entitled "METHODS OF SHAPING CHOCOLATE PRODUCTS" filed contemporaneously herewith, and both of which are incorporated by reference herein. Forming or embossing is a process in which a chocolate composition is deposited onto a surface and a chilled device is brought into contact with at least one surface of the chocolate composition to at least partially solidify the contacted surface. A forming or embossing device as disclosed in the aforementioned Application could be coated with a material of low surface energy to facilitate release of the device from the chocolate surface, thus leading to greater production efficiencies as described in above invention.

The examples which follow are intended to illustrate certain preferred embodiments of the invention, and no limitation of the invention is implied. All surface energy values set forth herein were determined using the three-liquid contact angle procedure of about 23° C. unless otherwise indicated.

COMPARATIVE EXAMPLE 1

A milk chocolate composition was prepared using the formulation shown below:

Milk Chocolate Formulation
Sugar 50.00%
Cocoa Butter 20.49%
Whole Milk Powder 18.00%
Chocolate Liquor 11.00%
Lecithin 0.50%
Vanillin 0.01%

The chocolate mixture was refined to reduce the solid particle sizes to 25 microns (by micrometer) and then loaded into a Petzholdt Conge. The chocolate was dry conged for 6 hours after which lecithin is added. The chocolate was then spun in the conge for 30 minutes. The conged chocolate was transferred into a tank where additional lecithin and cocoa butter were added (standardization) to achieve an apparent viscosity of 8,000 cps at 45° C. The standardized chocolate was then tempered in a continuous Sollich Solltemper-Turbo Model MSV3000 where the chocolate was cooled from 45° C. to 27° C. with aggressive shear to produce cocoa butter crystals of stable and unstable polymorphs. The tempered chocolate was warmed slightly in the last section of the Solltemper to 29° C. to melt out unstable crystals. The tempered chocolate was at 29° C. and had a temper level of 4.5 CTU (° F.) (2.5° C. CTU) and −0.5 slope as determined by Tricor Tempermeter Model 501.

The chocolate was then pumped to the hopper of an Aasted depositor on the Aasted Molding line. Rigid polycarbonate molds with a surface energy of about 40 mJ/m$^2$ at approximately 20° C. to 23° C., with molding cavities for 100 g chocolate blocks were filled by ribbon depositing. The molds were vibrated for 60 seconds to level the chocolate in the molds. They then moved into a cooling tunnel where cooling was achieved by convective cooling using air at temperature of 10° C. and an average H-value of 30 W/m$^{2\circ}$ C. The molds remained in the tunnel for 40 minutes and were then demolded by inverting the molds and striking the back of the mold with a hammer. The resultant product was a glossy molded chocolate 100 g chocolate bar which was stable at room temperature.

EXAMPLE 1

Chocolate is produced as set forth in Comparative Example 1 and then pumped to the hopper of a one shot depositor. Rigid polycarbonate molds, coated with PTFE to provide a low surface energy contact surface, are filled with chocolate and levelled by vibration. The molds are then moved into a cooling tunnel where cooling is achieved by convective cooling using air at temperature of 10° C. and an average H-value of 30 W/m$^{2\circ}$ C. The molds remain in the tunnel for 20 minutes and are then demolded by inverting the molds and striking the backs of the molds with a hammer. The resultant product is a glossy molded 100 g chocolate bar which is stable at room temperature.

EXAMPLE 2

Chocolate is produced as set forth in Comparative Example 1 and then pumped to the hopper of a one shot depositor. Rigid molds produced from poly [tetrafluoroethylene] are filled with chocolate and levelled by vibration. The molds are then moved into a cooling tunnel where cooling is achieved by convective cooling using air at temperature of 10° C. and an average H-value of 30 W/m$^{2\circ}$ C. The molds remain in the tunnel for 20 minutes and are then demolded by inverting the molds and striking the backs of the molds with a hammer. The resultant product is a glossy molded 100 g chocolate bar which is stable at room temperature.

EXAMPLE 3

Chocolate was produced as set forth in Comparative Example 1 and then pumped to the hopper of a one shot depositor. Flexible molds produced from Palesit 394 (available from Mason Chemical Co. Ltd., Croydon, U.K.), with a surface energy of about 17 mJ/m$^2$, were filled with chocolate and levelled by vibration. The molds were then moved into a cooling tunnel where cooling was achieved by convective cooling using air at temperature of 10° C. and an average H-value of 30 W/m$^{2\circ}$ C. The molds remained in the tunnel for 15 minutes and were then demolded by flexing the inverted molds. The resultant product was a glossy molded 100 g chocolate bar which was stable at room temperature.

COMPARATIVE EXAMPLE 2

Chocolate was produced and polycarbonate molds filled and levelled as set forth in Example 1. The molds were then moved into a cooling tunnel where cooling was achieved by convective cooling using air at temperature of +10° C. and an average H-value of 125 W/m²° C. The molds remained in the tunnel for 9 minutes and were then demolded by inverting the molds and striking the back of the mold with a hammer. The resultant product was a glossy molded 100 g chocolate bar which was stable at room temperature

EXAMPLE 4

Chocolate was produced and low surface energy flexible molds produced from Palesit 394, with a surface energy of about 17 mJ/m² were filled with chocolate and levelled by vibration as set forth in Example 3. The molds were then moved into a cooling tunnel where cooling was achieved by convective cooling using air at temperature of +10° C. and an average H-value of 125 W/m²° C. The molds remained in the tunnel for 6 minutes and were then demolded by flexing the inverted molds which changes the dimensions of the mold cavity thereby releasing the chocolate. The resultant product was a glossy molded 100 g chocolate bar which was stable at room temperature.

EXAMPLE 5

Chocolate was produced and low surface energy flexible molds produced from Palesit 394, with a surface energy of about 17 mJ/m² were filled with chocolate and levelled by vibration as set forth in Example 3. The molds were then moved into a cooling tunnel where cooling was achieved by convective cooling using air at temperature of −15° C. and an average H-value of 20 W/m²° C. The molds remained in the tunnel for 6 minutes and were then demolded by flexing the inverted molds which changes the dimensions of the mold cavity thereby releasing the chocolate. The resultant product was a glossy molded 100 g chocolate bar which was stable at room temperature.

The results from Examples 1–5 and Comparative Examples 1–2 are summarized in Table 1. The mold type is indicated as rigid (R), flexible (F), low surface energy (LE) or a combination thereof. Table 1 also lists the heat transfer coefficient (H) value of the cooling air, cooling air temperature, demold technique employed, and the cooling time to demold in minutes, respectively.

TABLE 1

Demolding of Chocolate Bars

| Ex. | Mold Type | H, W/m² ° C. | Temp. (° C.) | Demold Tech. | Cooling Time |
|---|---|---|---|---|---|
| Comp. 1 | R | 30 | 10 | strike | 40 |
| 1 | R, LE | 30 | 10 | strike | 20 |
| 2 | R, LE | 30 | 10 | strike | 20 |
| 3 | F, LE | 30 | 10 | flex | 15 |
| Comp. 2 | R | 125 | 10 | strike | 9 |
| 4 | F, LE | 125 | 10 | flex | 6 |
| 5 | F, LE | 20 | −15 | flex | 6 |

In comparison with the conventional molding technique demonstrated in Comparative Example 1, a rigid mold having low surface energy allows faster demolding of product (shorter cooling time to demold) under the same cooling conditions, as shown in Examples 1 and 2. Thus, when the substrates are equivalent (having equivalent dimensions), and when the releasing methods are equivalent (in this case, by striking, although other releasing methods such as, for example, tapping, flipping, flexing, or lifting as in a vacuum operated pick and place method, etc. would show similar results), the low surface energy substrate demonstrated releasing in a reduced period of time when compared to the standard non-low surface energy polycarbonate substrate. Furthermore, equivalent releasing methods should utilize the same force or energy within the same method of release.

A mold having low surface energy which is also flexible improves demold time further, as shown in Example 3. Examples 4–5 and Comparative Example 2 employ more rapid cooling than is conventionally used. Under these conditions, a flexible mold having low surface energy allows shorter demold time than a rigid mold having higher surface energy.

COMPARATIVE EXAMPLE 3

Chocolate was produced as set forth in Comparative Example 1 and subsequently aerated to a density of approximately 0.8 g/cm³. The aerated chocolate was then pumped to the hopper of a Knoble CCM9 depositor. Rigid polycarbonate molds, at approximately 20° C. to 23° C., with star shaped molding cavities (approximately 1 cm³ cavities) were filled by flooding the mold and scraping off the excess chocolate. The molds were vibrated for only about 20 seconds to level the chocolate in the molds. They then moved into a cooling tunnel where cooling was achieved by convective cooling using air at temperature of 10° C. and an average H-value of 30 W/m²° C. The molds remained in the tunnel for 20 minutes and were then demolded by inverting the molds and striking the back of the mold with a particularly severe hammer blow. The resultant product was a glossy molded star shaped chocolate confection having a density of about 0.98 g/cm³. The chocolate confection was stable at room temperature.

EXAMPLE 6

Chocolate was produced as set forth in Comparative Example 1 and subsequently aerated to a density of approximately 0.8 g/cm³ as set forth in Comparative Example 3. The aerated chocolate was then pumped to the hopper of a Knoble CCM9 depositor. Accurate volumes of the aerated chocolate were deposited into star shaped molding cavities (approximately 1 cm³ cavities) in low surface energy flexible molds produced from Palesit 394, with a surface energy of about 17 mJ/m². The chocolate was levelled using a chilled tamping device. The molds were then moved into a cooling tunnel where cooling was achieved by convective cooling using air at temperature of 10° C. and an average H-value of 30 W/m²° C. The molds remained in the tunnel for 8 minutes and were then demolded by flexing the mold cavity wherein, the flexing was accomplished by the application on the back of the mold cavity by rigid pins. Excessive force is not required for demolding and the star shaped confections released easily from the mold. The resultant product was a glossy molded star shaped chocolate confection having a density of about 0.90 g/cm³. The chocolate confection was stable at room temperature.

EXAMPLE 7

Chocolate was produced as set forth in Comparative Example 1 and subsequently aerated to a density of approximately 0.8 g/cm³ as set forth in Comparative Example 3. The aerated chocolate was then pumped to the hopper of a Knoble CCM9 depositor. Accurate volumes of the aerated chocolate were deposited into star shaped molding cavities (approximately 1 cm³ cavities) in low surface energy flexible molds produced from Palesit, with a surface energy of about 17 mJ/m². The chocolate was levelled using a chilled tamping device. The molds were then moved into a cooling tunnel where cooling was achieved by convective cooling using air at temperature of +10° C. and an average H-value of 125 W/m²° C. The molds remained in the tunnel for 4 minutes and were then demolded by flexing the mold cavity wherein, the flexing was accomplished by the application on the back of the mold cavity by rigid pins. Excessive force was not required for demolding and the star shaped confections released easily from the mold. The resultant product was a glossy molded star shaped chocolate confection having a density of about 0.90 g/cm³. The chocolate confection was stable at room temperature.

EXAMPLE 8

Chocolate was produced as set forth in Comparative Example 1 and subsequently aerated to a density of approximately 0.8 g/cm³ as set forth in Comparative Example 3. The aerated chocolate was then pumped to the hopper of a Knoble CCM9 depositor. Accurate volumes of the aerated chocolate were deposited into star shaped molding cavities (approximately 1 cm³ cavities) in low surface energy flexible molds produced from Palesit, with a surface energy of about 17 mJ/m². The chocolate was levelled using a chilled tamping device. The molds were then moved into a cooling tunnel where cooling was achieved by convective cooling using air at temperature of –15° C. and an average H-value of 50 W/m²° C. The molds remained in the tunnel for 4 minutes and were then demolded by flexing the mold cavity wherein, the flexing was accomplished by the application on the back of the mold cavity by rigid pins. Excessive force was not required for demolding and the star shaped confections released easily from the mold. The resultant product was a glossy molded star shaped chocolate confection having a density of about 0.90 g/cm³. The chocolate confection was stable at room temperature.

Results from Examples 6–8 and Comparative Example 3 are listed in Table 2, as described for Table 1, with a tabulation of the final density (Final Dens.) of each molded star shaped chocolate confection.

TABLE 2

Demolding of Aerated Chocolate

| Ex. | Mold Type | H, W/m² ° C. | Temp. (° C.) | Demold Tech. | Cool Time | Final Dens. |
| --- | --- | --- | --- | --- | --- | --- |
| Comp. 3 | R | 30 | 10 | strike | 20 | 0.98 |
| 6 | F, LE | 30 | 10 | flex | 8 | 0.90 |
| 7 | F, LE | 125 | 10 | flex | 4 | 0.90 |
| 8 | F, LE | 50 | –15 | flex | 4 | 0.90 |

Comparison of Examples 6–8 with the conventional method of Comparative Example 3 shows that low surface energy molds that are also flexible allow much faster demolding of aerated chocolates under various cooling conditions. The difference in ease of demolding is even greater than shown by the times in Table 2 for two reasons: (1) a particularly severe blow was required to demold the aerated chocolate from the rigid mold of Comparative Example 3; and (2) the density of the aerated chocolates in Examples 6–8 was lower than that of the chocolate in Comparative Example 3, increasing the difficulty of demolding in Examples 6–8.

COMPARATIVE EXAMPLE 4

Chocolate is produced as set forth in Comparative Example 1 and is then pumped to the hopper of a depositor on a shell moulding line. Rigid polycarbonate molds, at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel. The caramel composition is set forth below and is prepared in a manner similar to that described in Minifie, 3rd Ed., pp 533–537.

| Soft Caramel Formulation | |
| --- | --- |
| Corn Syrup | 40.00% |
| Sweetened Cond. Whole Milk | 37.40% |
| Sugar | 13.50% |
| Milk Butter | 5.19% |
| Water | 3.40% |
| Salt | 0.50% |
| Flavorings | 0.01% |

After the filled shells are backed off, the molds are moved into a cooling tunnel where cooling is achieved by convective cooling using air at temperature of 10° C. and an average H-value of 30 W/m²° C. The molds remain in the tunnel for 30 minutes and are then demolded by inverting the molds and striking the back of the mold with a severe hammer blow. The resultant product is an intact glossy molded shaped segmented finger piece confection which is stable at room temperature. Some cracking of the chocolate shell often occurs under these conditions due to demold stress resulting in "leaking" centers.

EXAMPLE 9

Chocolate is produced as set forth in Comparative Example 1 and is then pumped to the hopper of a depositor on a shell moulding line. Polycarbonate molds coated with Palesit 394, at a temperature of approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at a temperature of +10° C. and an average H-value of 30 W/m²° C. The molds remain in the tunnel for 20 minutes and are then demolded by inverting the molds and striking the back of the mold with a hammer blow. Significantly lower force is required to demold this product compared to the product described in Comparative Example 4. The resultant product is a glossy molded shaped segmented finger piece confection which is stable at room temperature. Less product damage is observed with lower incidence of "leaking" centers.

EXAMPLE 10

Chocolate is produced as set forth in Comparative Example 1 and is then pumped to the hopper of a depositor on a shell moulding line. Flexible molds produced from Palesit, with a surface energy of about 17 mJ/m², at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at temperature of +10° C. and an average H-value of 30 W/m²° C. The molds remain in the tunnel for 15 minutes and are then demolded by flexing the inverted molds which changes the dimensions of the mold cavity thereby releasing the filled chocolate confection. The resultant product is a glossy molded shaped segmented finger piece confection. The product is stable at room temperature. Less product damage is observed with a lower incidence of "leaking" centers.

EXAMPLE 11

Chocolate is produced as set forth in Example 1 and is then pumped to the hopper of a depositor on a shell moulding line. Polycarbonate molds with a coating of Palesit 394, at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at temperature of +10° C. and an average H-value of 125 W/m²° C. The molds remain in the tunnel for 10 minutes and are then demolded by inverting the molds and striking the backs of the molds with a hammer blow. Significantly lower force is required to demold this product compared to the product described in Comparative Example 4. The resultant product is a glossy molded shaped segmented finger piece confection which is stable at room temperature. Less product damage is observed with lower incidence of "leaking" centers.

EXAMPLE 12

Chocolate is produced as set forth in Comparative Example 1 and is then pumped to the hopper of a depositor on the a shell moulding line. Flexible molds produced from Palesit, with a surface energy of about 17 mJ/m² at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at temperature of +10° C. and an average H-value of 125 W/m²° C. The molds remain in the tunnel for 7 minutes and are then demolded by flexing the inverted molds which changes the dimensions of the mold cavity thereby releasing the filled chocolate confection. The resultant product is a glossy molded shaped segmented finger piece confection. The product is stable at room temperature. Less product damage is observed with lower incidence of "leaking" centers.

EXAMPLE 13

Chocolate is produced as set forth in Comparative Example 1 and is then pumped to the hopper of a depositor on a shell moulding line. Rigid molds with a low surface energy coating, at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at temperature of −15° C. and an average H-value of 20 W/m²° C. The molds remain in the tunnel for 8 minutes and are then demolded by inverting the molds and striking the backs of the molds with a hammer blow. Significantly lower force is required to demold this product compared to the product described in Comparative Example 4. The resultant product is a glossy molded shaped segmented finger piece confection which is stable at room temperature. Less product damage is observed with lower incidence of "leaking" centers.

EXAMPLE 14

Chocolate is produced as set forth in Comparative Example 1 and is then pumped to the hopper of a depositor on the a shell moulding line. Flexible molds produced from Palesit, with a surface energy of about 17 mJ/m², at approximately 20° C. to 23° C., with molding cavities for shaped segmented finger pieces are filled by ribbon depositing. Shell molding is carried out in the traditional manner as described in "Moulds and Moulding: Examples and Techniques", by H. Whetstone in Manufacturing Confectioner, June 1996.

The chocolate shells in this case are filled with a soft caramel similar to that described in Comparative Example 4. After the filled shells are backed off, the molds are moved into a cooling tunnel where cooling is achieved by convective cooling using air at temperature of −15° C. and an average H-value of 20 W/m²° C. The molds remain in the tunnel for 6 minutes and are then demolded by flexing the inverted molds which changes the dimensions of the mold cavity thereby releasing the filled chocolate confection. The resultant product is a glossy molded shaped segmented finger piece confection. The product is stable at room temperature. Less product damage is observed with lower incidence of "leaking" centers.

EXAMPLES 15–20

Different silicone rubber materials were made into molds. The finished mold materials were evaluated to determine their surface energy characteristics and corresponding release characteristics. The silicone rubbers of Example 15–19 were prepared using an injection molding technique while the silicone rubber of Example 20 was prepared using an open pour technique. In addition the silicone rubber molds of Examples 15–19 were used as inserts in a metal carrier having multiple openings. A silicone rubber mold was inserted into each opening for use. On the other hand, the mold of Example 20 was a continuous silicone mold. Thus, the mold of Example 20 was more flexible than those of Example 15–19.

Each mold was filled with a chocolate composition. The mold was then placed in a cooling environment with a temperature of −15° C. at an H-value of 50 W/m²° C. for 3 minutes after filling. The molds were inverted and flexed. The release characteristics of the molds were evaluated:

P (poor)—chocolate stuck to mold
F (fair)—demolded, but slight cracking
G (good)—clean demolding—no cracking The evaluation was repeated at various mold temperatures as described in Table 3 below. In addition, the surface energy ($\gamma^{LW}$) of each mold was measured at about 23° C. using the three-liquid contact angle procedure described previously. Those results are also set forth in Table 3 below.

TABLE 3

| Temp ° C. | Ex. 15 | Ex. 16 | Ex. 17 | Ex. 18 | Ex. 19 | Ex. 20 |
|---|---|---|---|---|---|---|
| 22 | G | P | P | P | P | G |
| 15 | G | F | F | P/F | P/F | G |
| 10 | G | G | G | G | F | G |
| <10 | G | G | G | G | G | G |
| $\gamma^{LW}$ (mJ/m²) | 17.3 | 19.4 | 19.5 | 21.0 | 23.1 | 26 |

Ex. 15 - Palesit 394 silicone rubber - injection molded inserts
Ex. 20 - Palesit 394 silicone rubber - pour molded sheet The results show a clear correlation between release properties of the mold, surface energy ($\gamma^{LW}$) and temperature. When the molds of Examples 15–19 are cooled down, the relative surface energy of the material decreases, i.e., the ease of demolding improves as temperature decreases. Since the molds of Examples 15–19 were all made and used in the same manner, the release results clearly indicate that the lower the surface energy of the silicone rubber as measured at 23° C., the broader the range of temperature providing the acceptable release results during use. Interestingly, Example 20 shows an acceptable release profile over a broad temperature range despite a somewhat higher surface energy as measured at 23° C. This, however, is believed to result because the higher degree of flexing of the design of the mold of Example 20 (silicone rubber mold sheet vs. silicone rubber insert) overcomes the relatively higher surface energy of the silicone rubber. Thus, one skilled in the art will understand that the desired surface energy required to provide good mold release properties may be dependent on the flexibility of the design of the mold. Based on the disclosure herein one of ordinary skill in the art will be able to determine the desired surface energy of the mold knowing the flexibility of the design of the mold and the operating temperature of the mold process without undue experimentation. The results set forth above clearly show that with all things substantially equivalent, the lower the surface energy of the mold surface the greater the temperature range providing good release properties.

Other variations and modifications of this invention will be obvious to those skilled in the art. This invention is not limited except as set forth in the claims.

What is claimed is:

1. A method for producing a fat-based confection composition, said method comprising the steps of:
   (a) contacting a fat-based confection composition containing a liquid fat phase with a surface of a substrate to form said fat-based confection composition, said substrate surface having a surface energy less than about 30 mJ/m² as measured at about 23° C. using a three-liquid contact angle procedure; and
   (b) releasing the formed fat-based confection composition from said substrate surface.

2. The method according to claim 1, wherein said substrate is a mold.

3. The method according to claim 1, wherein said substrate is a former or embosser.

4. The method according to claims 2 or 3, wherein said surface is comprised of a material selected from the group consisting of silicone material and polytetrafluoroethylene.

5. The method according to claim 4, wherein said silicone material is a silicone rubber.

6. The method according to claim 5, wherein said surface energy of said silicone rubber is less than 25 mJ/m².

7. The method according to claim 6, wherein said surface energy is less than 20 mJ/m².

8. The method of claim 2, wherein the molded fat-based confection product is a molded chocolate product and the fat-based confection composition is a chocolate composition.

9. The method of claim 8, wherein the molded chocolate product is released from the mold by inverting the mold.

10. The method of claim 2, further comprising vibrating the mold.

11. The method of claim 8, wherein the molded chocolate product is removed from the mold by a pick-and-place system.

12. The method of claim 8, wherein the mold is a flexible mold constructed of a material having an elongation at break greater than about 200% and a shore hardness of less than 50 A.

13. The method of claim 12, further comprising distorting the mold to facilitate removal of the molded chocolate product.

14. The method of claim 13, further comprising the step of tamping the chocolate composition with a tamping device to completely fill the mold.

15. The method of claim 14, wherein the chocolate composition is aerated.

16. The method of claim 15, wherein the contacting surface has a surface energy less than about 25 mJ/m².

17. The method of claim 16, wherein the mold is a flexible mold constructed of a material having an elongation at break greater than about 250% and a shore hardness of less than 40 A.

18. The method of claim 8, further comprising the step of cooling said chocolate composition under conditions effective to produce an average cooling rate in a center of the chocolate composition of from about 3° C./minute to about 10° C./minute.

19. The method of claim 8, further comprising the step of cooling said chocolate composition in an environment having an average convective heat transfer coefficient greater than about 50 w/m²° C.

20. A method of forming a chocolate product, said method comprising the step of contacting at least one surface of an edible mass comprising a chocolate composition having a liquid fat phase with a chilled forming device having a contacting surface temperature below 10° C., thereby at least partially solidifying at least one outer surface layer of the chocolate composition, wherein a contacting surface of said chilled forming device has a surface energy less than about 30 mJ/m² as measured at about 23° C. using a three-liquid contact angle procedure.

21. The method of claims 1, 2, or 3, wherein the releasing from said substrate is achieved in a reduced period of time when compared to a comparison releasing period of time for an equivalent polycarbonate substrate, wherein releasing methods are equivalent, and wherein a difference between the reduced period of time and the comparison releasing period of time is at least about 25% of the comparison releasing period of time.

22. The method of claim 21, wherein said difference is at least about 50% of the comparison releasing period of time.

* * * * *

UNITED STATES PATENT AND TRADEMARK OFFICE
CERTIFICATE OF CORRECTION

PATENT NO. : 6,165,531
DATED : December 26, 2000
INVENTOR(S) : William Harding et al.

Page 1 of 1

It is certified that error appears in the above-identified patent and that said Letters Patent is hereby corrected as shown below:

Title page,
Item [56], References Cited, under OTHER PUBLICATIONS,
After "B. Minifie," "Technology ," should read -- Technology, --.

Column 4,
Line 8, "the as" should read -- the --;
Line 45, "includes" should read -- include --; and
Line 53, "identify" should read -- identity --.

Column 8,
Line 29, "maybe" should read -- may be --.

Column 9,
Line 33, "Application" should read -- application --.

Column 15,
Line 48, "the a" should read -- a --.

Column 16,
Line 32, "the a" should read -- a --.

Signed and Sealed this

Ninth Day of April, 2002

Attest:

Attesting Officer

JAMES E. ROGAN
Director of the United States Patent and Trademark Office